(12) United States Patent
Chang

(10) Patent No.: US 7,448,596 B1
(45) Date of Patent: Nov. 11, 2008

(54) CABLE TIGHTENING DEVICE HAVING ANTI-THEFT FUNCTION

(76) Inventor: Wen-Cheng Chang, 2, Lane 276, Sec. 5, Zhangnan Rd., Changhua City, Changhua Hsien (TW)

( * ) Notice: Subject to any disclaimer, the term of this patent is extended or adjusted under 35 U.S.C. 154(b) by 48 days.

(21) Appl. No.: 11/646,975

(22) Filed: Dec. 28, 2006

(51) Int. Cl.
*B21F 9/00* (2006.01)
(52) U.S. Cl. .................. 254/223; 254/218; 254/239; 24/70 ST; 24/69 ST; 410/100
(58) Field of Classification Search ............... 254/217, 254/218, 223, 238, 239; 24/70 ST, 69 ST, 24/69 CT; 410/100
See application file for complete search history.

(56) References Cited

U.S. PATENT DOCUMENTS

| | | | |
|---|---|---|---|
| 5,282,706 A | * | 2/1994 | Anthony et al. ............. 410/100 |
| 5,549,429 A | * | 8/1996 | Sergent ........................ 410/96 |
| 6,547,218 B2 | * | 4/2003 | Landy ........................ 254/217 |
| 6,708,953 B1 | * | 3/2004 | Chang ........................ 254/218 |
| 7,100,901 B2 | * | 9/2006 | Gleinser ..................... 254/218 |

\* cited by examiner

*Primary Examiner*—Emmanuel M Marcelo
(74) *Attorney, Agent, or Firm*—Alan Kamrath; Kamrath & Associates PA

(57) ABSTRACT

A cable tightening device includes a fixed unit, a rotation member rotatably mounted on the fixed unit, a movable unit including a movable member to drive the rotation member and a release member to lock or unlock the movable member, and a locking unit to lock the release member onto the movable member releasably. Thus, the release member is locked onto the movable member by the locking unit and cannot be pulled upwardly to detach the push plates of the movable unit from the ratchet wheels of the fixed unit so that the ratchet wheels are locked to lock the rotation member to prevent the cable from being loosened so as to protect the cargo wound by the cable, thereby achieving the anti-theft purpose.

16 Claims, 8 Drawing Sheets

US 7,448,596 B1

CABLE TIGHTENING DEVICE HAVING ANTI-THEFT FUNCTION

BACKGROUND OF THE INVENTION

1. Field of the Invention

The present invention relates to a cable tightening device and, more particularly, to a cable tightening device for tightening or loosening a cable so as to bind or release a cargo.

2. Description of the Related Art

A conventional cable tightening device is mounted on a wheeled vehicle having a larger size, such as a truck or the like, to tighten a cable which is wound around a cargo so as to tighten the cargo. However, the conventional cable tightening device is opened easily, so that the cable is loosened easily and quickly to release the cargo, and the cargo is easily stolen.

BRIEF SUMMARY OF THE INVENTION

In accordance with the present invention, there is provided a cable tightening device, comprising a fixed unit including a base member, a rotation member rotatably mounted on the base member of the fixed unit, a movable unit including a movable member rotatably mounted on the rotation member and rotatable relative to the base member of the fixed unit to drive the rotation member to rotate relative to the fixed unit in a oneway direction, and a release member movably mounted on the movable member to lock or unlock the movable member and the base member, and a locking unit mounted on the release member of the movable unit and locked onto the movable member releasably to lock the release member onto the movable member releasably to stop movement of the release member so as to prevent the cable from being loosened.

The primary objective of the present invention is to provide a cable tightening device having an anti-theft function.

Another objective of the present invention is to provide a cable tightening device, wherein the release member is locked onto the movable member by the mandrel of the locking unit and cannot be pulled upwardly to detach the push plates from the ratchet wheels so that the ratchet wheels are locked to lock the rotation member to prevent the cable from being loosened so as to protect the cargo wound by the cable, thereby achieving the anti-theft purpose.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
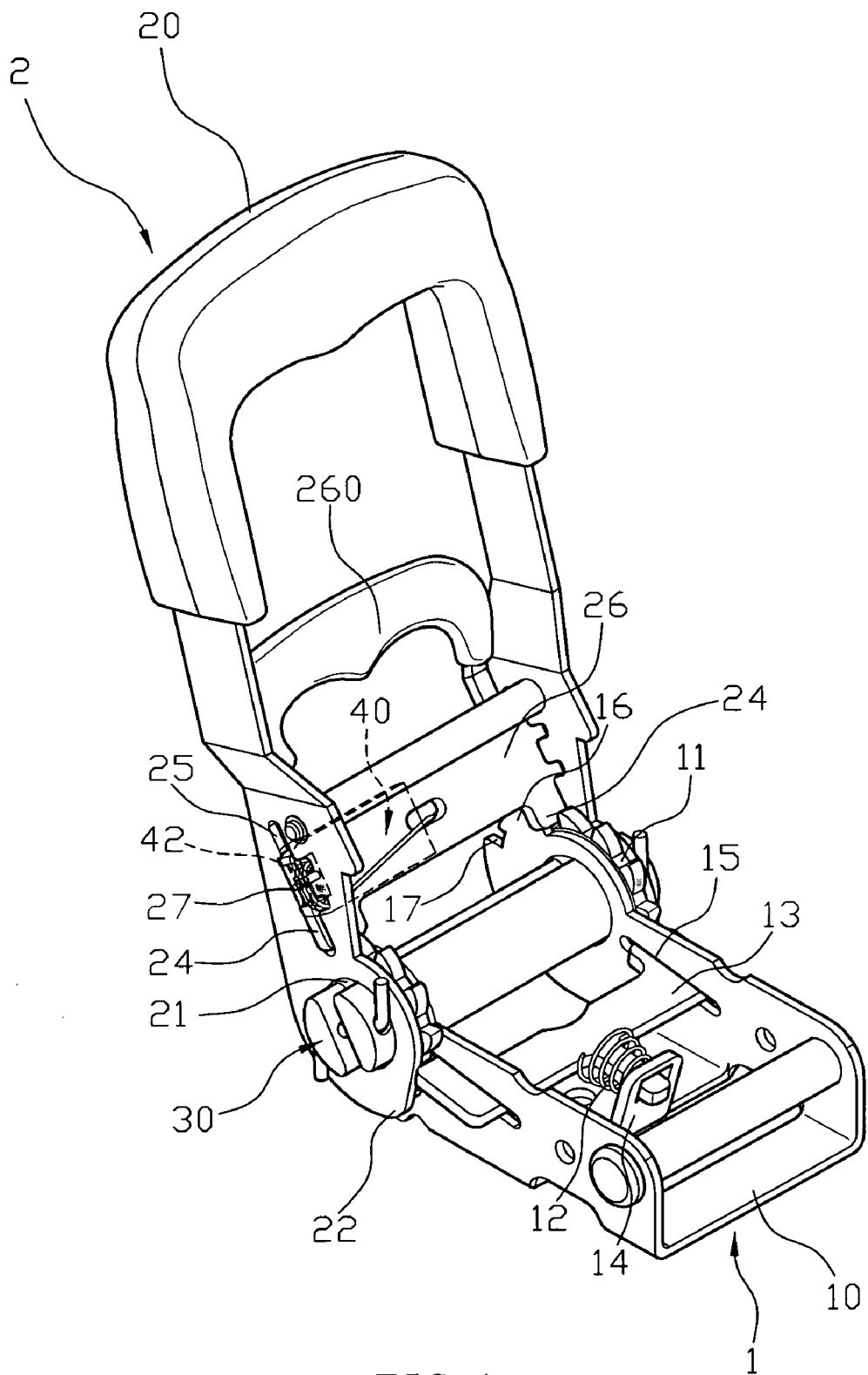
FIG. 1 is a perspective view of a cable tightening device in accordance with the preferred embodiment of the present invention.
Figure 2:
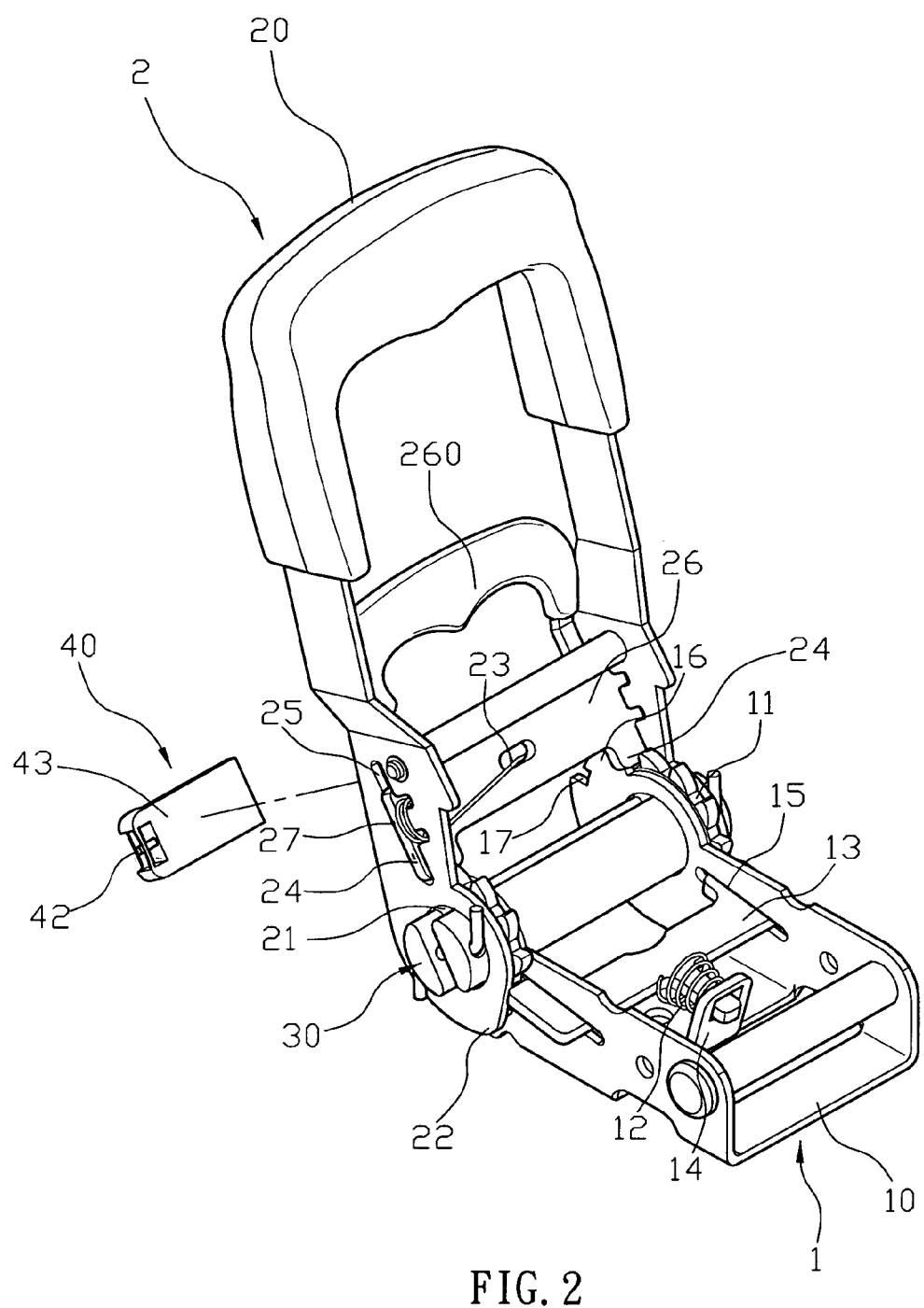
FIG. 2 is a partially exploded perspective view of the cable tightening device as shown in FIG. 1.
Figure 3:
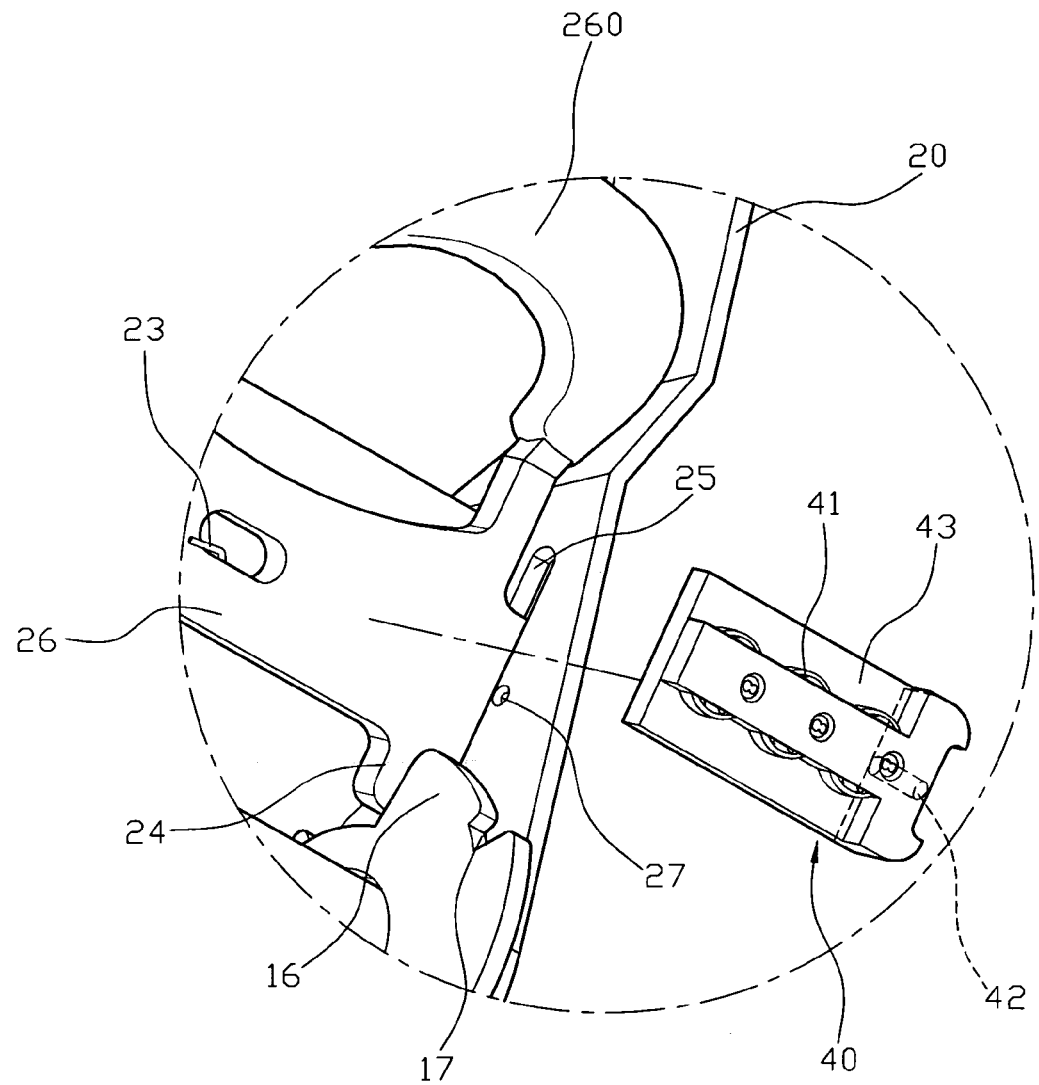
FIG. 3 is a partially exploded perspective enlarged view of the cable tightening device as shown in FIG. 1.
Figure 4:
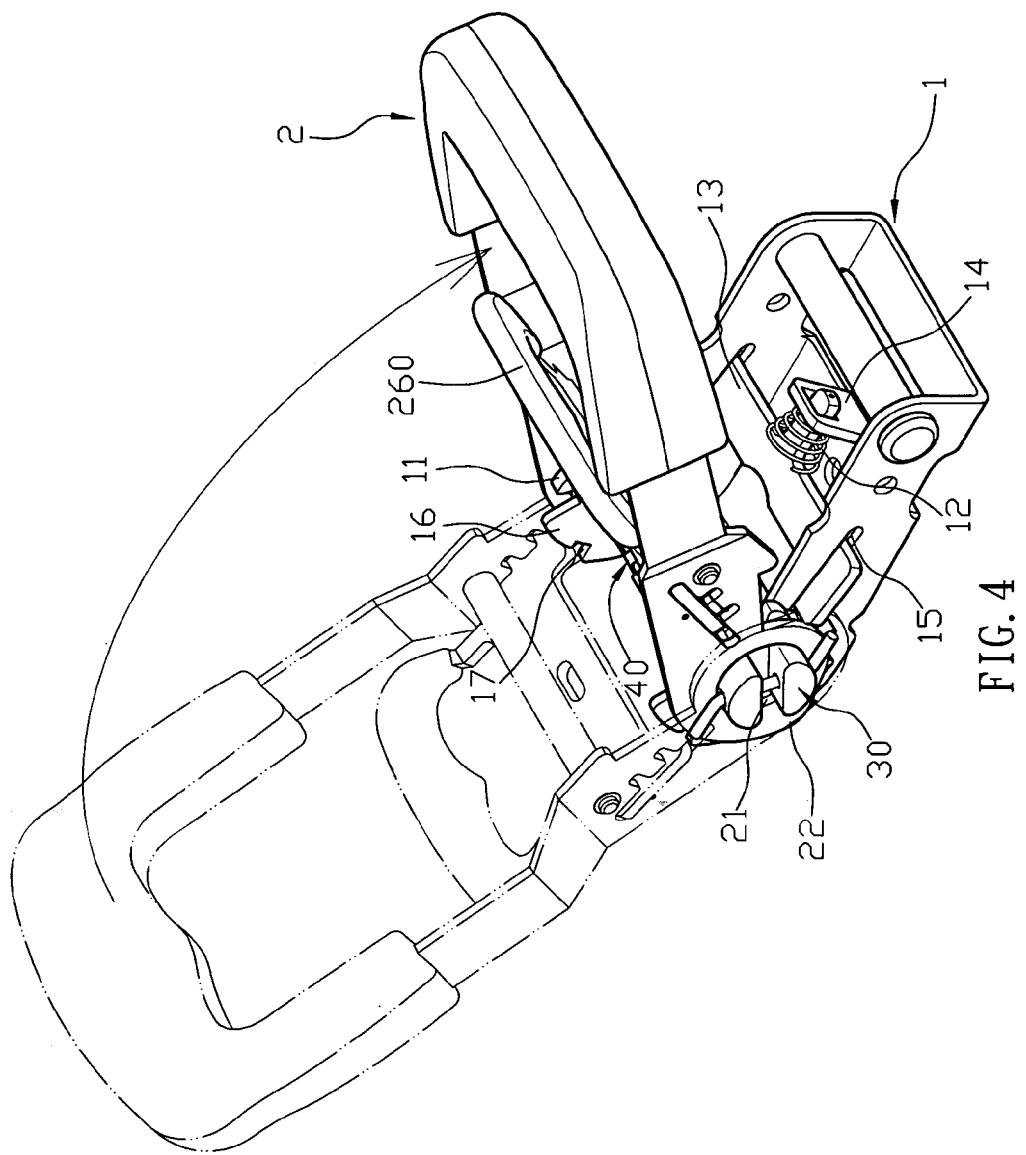
FIG. 4 is a schematic operational view of the cable tightening device as shown in FIG. 1.

Referring to the drawings and initially to FIGS. 1-3, a cable tightening device in accordance with the preferred embodiment of the present invention comprises a fixed unit 1 including a base member 10, a rotation member 30 rotatably mounted on the base member 10 of the fixed unit 1 to wind and unwind a cable (not shown) by rotation of the rotation member 30, a movable unit 2 including a movable member 20 rotatably mounted on the rotation member 30 and rotatable relative to the base member 10 of the fixed unit 1 to drive the rotation member 30 to rotate relative to the fixed unit 1 in a oneway direction and a release member 26 movably mounted on the movable member 20 to lock or unlock the movable member 20 and the base member 10, and a locking unit 40 mounted on the release member 26 of the movable unit 2 and locked onto the movable member 20 releasably to lock the release member 26 onto the movable member 20 releasably to stop movement of the release member 26 so as to prevent the cable from being loosened.

The fixed unit 1 further includes two opposite ratchet wheels 11 secured on two opposite ends of the rotation member 30 to rotate the rotation member 30, a stop plate 13 movably mounted on the base member 10 and releasably engaged with the ratchet wheels 11 to allow the ratchet wheels 11 to rotate in a oneway direction, a fixing seat 14 secured on the base member 10, and an elastic member 12 biased between the stop plate 13 and the fixing seat 14 to push the stop plate 13 toward the ratchet wheels 11 so that the stop plate 13 is engaged with the ratchet wheels 11 at a normal state. The base member 10 of the fixed unit 1 has two opposite sidewalls each formed with a guide track 15 to guide movement of the stop plate 13. Each of the two opposite sidewalls of the base member 10 formed with an upwardly protruding catch portion 16 and a retaining recess 17.

The release member 26 of the movable unit 2 has a first end formed with two outwardly protruding push plates 24 releasably engaged with the ratchet wheels 11 of the fixed unit 1 to push the ratchet wheels 11 to rotate in a oneway direction when the movable member 20 of the movable unit 2 is rotatable toward the base member 10 of the fixed unit 1. The release member 26 of the movable unit 2 has a second end formed with a penetrated grip portion 260 to facilitate a user holding the release member 26. The catch portion 16 of the fixed unit 1 is located between the retaining recess 17 of the fixed unit 1 and the respective push plate 24 of the release member 26. Each of the push plates 24 of the release member 26 has a first side engaged with the respective ratchet wheel 11 of the fixed unit 1 and a second side rested on the respective catch portion 16 of the fixed unit 1. The release member 26 of the movable unit 2 is movable outwardly relative to the base member 10 of the fixed unit 1 to pull the push plates 24 outwardly relative to the ratchet wheels 11 of the fixed unit 1 to detach the push plates 24 from the ratchet wheels 11 of the fixed unit 1 so that the push plates 24 of the movable unit 2 skip the ratchet wheels 11 of the fixed unit 1 when the movable member 20 of the movable unit 2 is rotatable on the rotation member 30. The movable member 20 of the movable unit 2 has two opposite sidewalls each formed with a guide track 25 to guide movement of the respective push plate 24 and each formed with a pivot hole 21 pivotally mounted on the rotation member 30. Each of the two opposite sidewalls of the movable member 20 has a periphery formed with a push portion 22 that is movable to push the stop plate 13 of the fixed unit 1 to detach from the ratchet wheels 11 of the fixed unit 1. The movable unit 2 further includes a torsion spring 23 biased between the release member 26 and the movable member 20 to push the push plates 24 of the release member 26 toward the ratchet wheels 11 of the fixed unit 1. The torsion spring 23 of the movable unit 2 is mounted in a respective guide track 25 of the movable member 20. The movable member 20 of the movable unit 2 has a side formed with a locking hole 27 facing the release member 26 and located beside a respective guide track 25 of the movable member 20.

The locking unit 40 includes a lock body 43 mounted on a surface of the release member 26 of the movable unit 2, a spring-biased mandrel 42 movably mounted in and protruded outwardly from the lock body 43 and releasably locked in the locking hole 27 of the movable member 20 to lock the release member 26 onto the movable member 20 releasably, and a plurality of number wheels 41 rotatably mounted on the lock body 43 and connected to the mandrel 42 to releasably lock the mandrel 42. The locking hole 27 of the movable member 20 has a tapered side facing the mandrel 42 of the locking unit 40, and the mandrel 42 of the locking unit 40 has a tapered distal end facing and matching the tapered side of the locking hole 27 of the movable member 20 as shown in FIG. 6.

As shown in FIGS. 1-4, when the movable member 20 of the movable unit 2 is pivoted toward the base member 10 of the fixed unit 1, the push plates 24 of the movable unit 2 are moved with the movable member 20 to push and rotate the ratchet wheels 11 which rotates the rotation member 30. On the contrary, when the movable member 20 of the movable unit 2 is pivoted outwardly relative to the base member 10 of the fixed unit 1, the push plates 24 of the movable unit 2 pass by the ratchet wheels 11 so that the rotation member 30 is not rotated. Thus, when the movable member 20 of the movable unit 2 is pivoted relative to the base member 10 of the fixed unit 1 in a reciprocal manner, the push plate 24 of the movable unit 2 is moved with the movable member 20 to push the ratchet wheels 11 to rotate in a oneway direction so that the rotation member 30 is rotated successively in a oneway direction to wind the cable successively so as to tighten a cargo.

Figure 5:
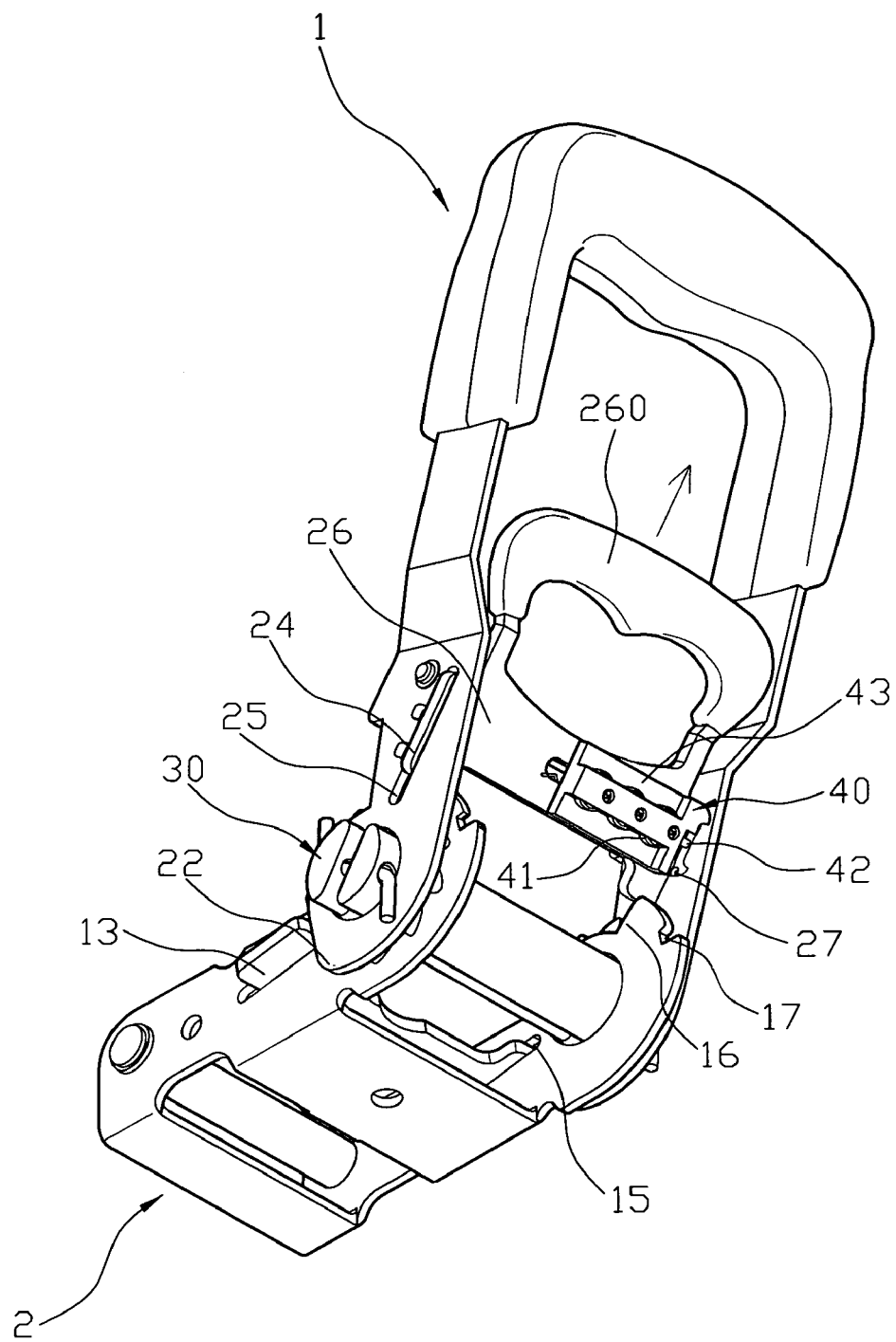
FIG. 5 is a schematic operational view of the cable tightening device as shown in FIG. 1.
Figure 6:
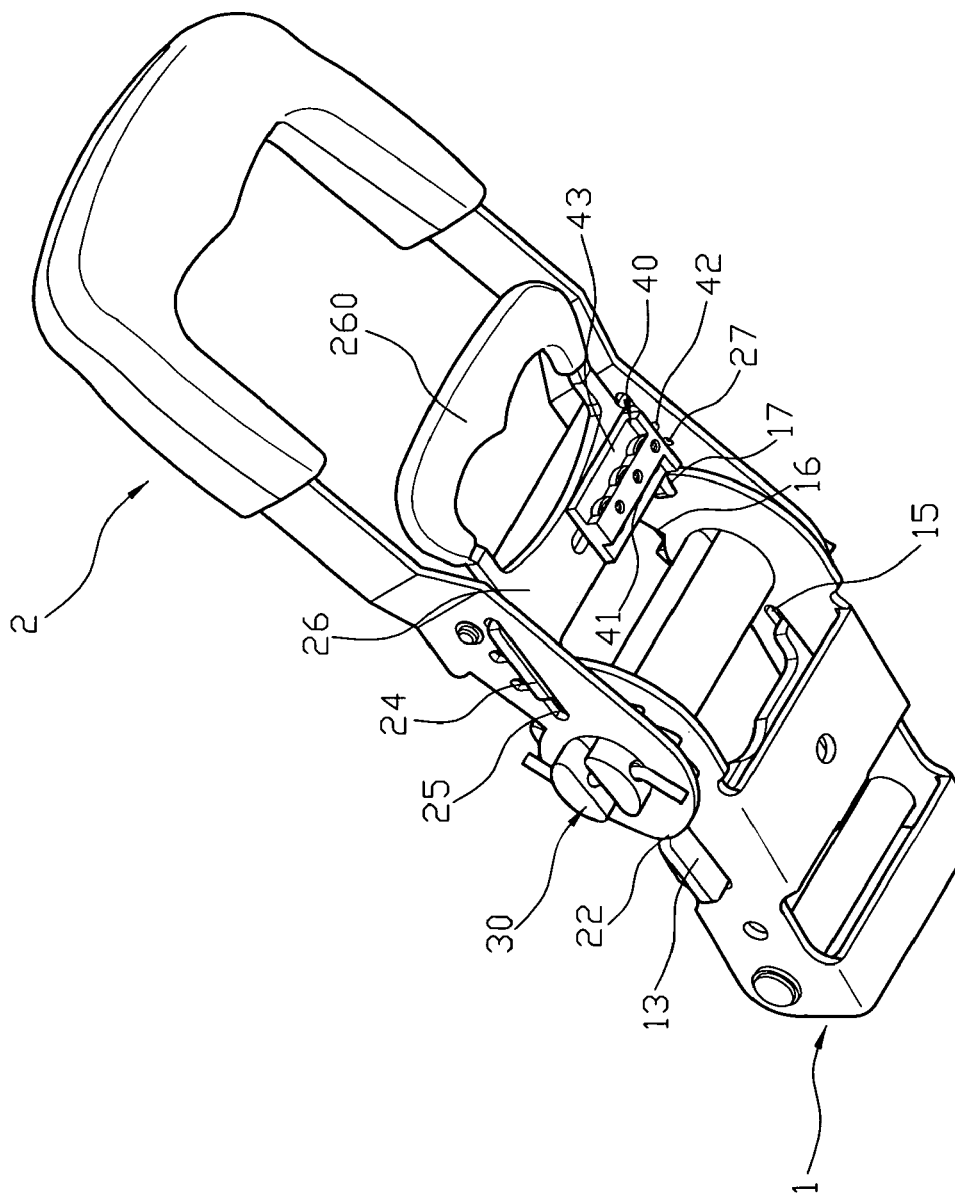
FIG. 6 is a schematic operational view of the cable tightening device as shown in FIG. 5.

As shown in FIGS. 1, 5 and 6, the number wheels 41 of the locking unit 40 are rotated to an unlocked position to unlock the mandrel 42 of the locking unit 40 so that the mandrel 42 is movable freely. Thus, when the release member 26 of the movable unit 2 is pulled upwardly, the mandrel 42 of the locking unit 40 is pressed to detach from the locking hole 27 of the movable member 20 by the tapering engagement therebetween so that the release member 26 of the movable unit 2 is movable freely. Then, the release member 26 of the movable unit 2 is pulled upwardly to pull the push plates 24 of the movable unit 2 outwardly relative to the ratchet wheels 11 of the fixed unit 1 to detach the push plates 24 of the movable unit 2 from the ratchet wheels 11 of the fixed unit 1. Then, the movable member 20 of the movable unit 2 is pivoted outwardly relative to the base member 10 of the fixed unit 1, so that the push plates 24 of the movable unit 2 pass by the catch portions 16 of the fixed unit 1 and are inserted into the retaining recesses 17 of the fixed unit 1, while the push portions 22 of the movable member 20 are moved forward to push the stop plate 13 of the fixed unit 1 to detach from the ratchet wheels 11 of the fixed unit 1. Thus, the ratchet wheels 11 of the fixed unit 1 are released from the push plates 24 of the movable unit 2 and the stop plate 13 of the fixed unit 1, so that the ratchet wheels 11 of the fixed unit 1 are rotatable freely, and the rotation member 30 is rotatable in the reverse direction to unwind the cable so as to loosen the cargo.

Figure 7:
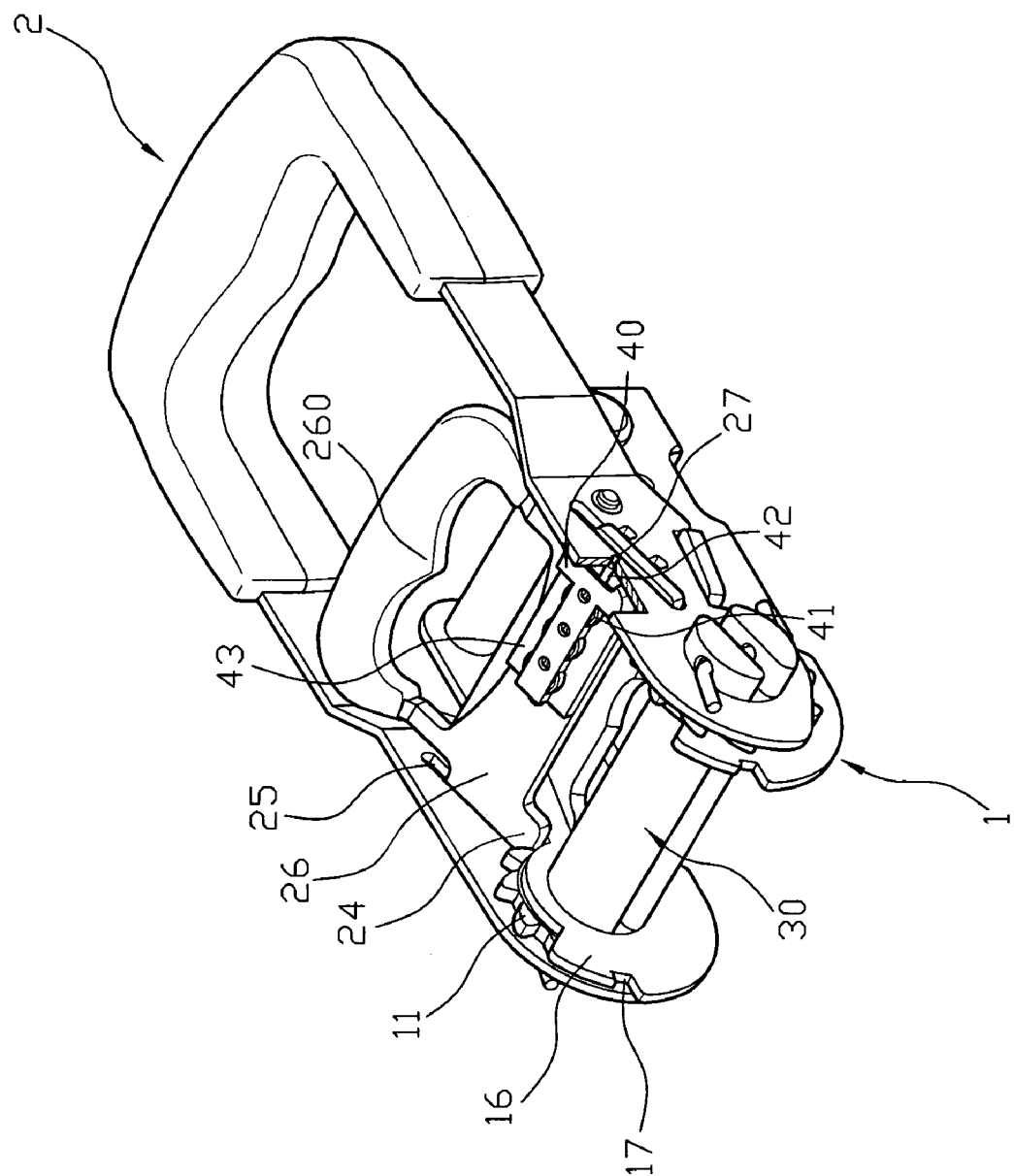
FIG. 7 is a schematic operational view of the cable tightening device as shown in FIG. 1.

On the other hand, as shown in FIGS. 1 and 7, when the cable tightening device is not in use, the release member 26 of the movable unit 2 is pulled upwardly to pull the push plates 24 of the movable unit 2 outwardly relative to the ratchet wheels 11 of the fixed unit 1 to detach the push plates 24 of the movable unit 2 from the ratchet wheels 11 of the fixed unit 1 so that the push plates 24 of the movable unit 2 skips the ratchet wheels 11 of the fixed unit 1 when the movable member 20 of the movable unit 2 is rotatable relative to the base member 10 of the fixed unit 1. Thus, the movable member 20 of the movable unit 2 is pivoted freely relative to the base member 10 of the fixed unit 1 until the movable member 20 of the movable unit 2 is rested on the base member 10 of the fixed unit 1 as shown in FIG. 7. At this time, the movable member 20 of the movable unit 2 is disposed at a horizontal state to prevent the movable member 20 from tilting upwardly so as to ensure the driving safety.

Figure 8:
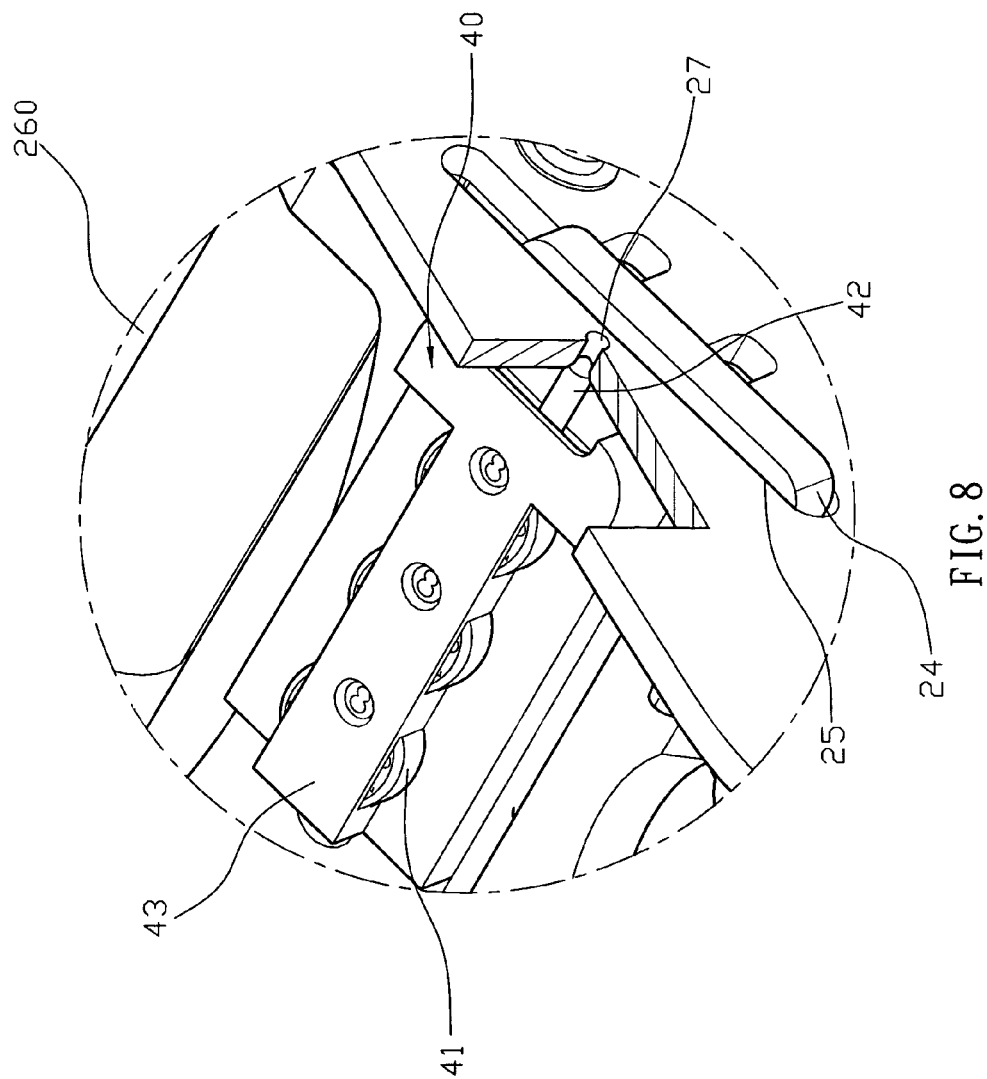
FIG. 8 is a locally enlarged view of the cable tightening device as shown in FIG. 7.

As shown in FIGS. 1, 7 and 8, the number wheels 41 of the locking unit 40 are rotated to a locked position where the mandrel 42 of the locking unit 40 is fixed by the number wheels 41 so that the mandrel 42 is locked in the locking hole 27 of the movable member 20 to lock the release member 26 onto the movable member 20. Thus, the release member 26 is fixed onto the movable member 20 by the mandrel 42 of the locking unit 40 and cannot be pulled upwardly to detach the push plates 24 from the ratchet wheels 11 so that the ratchet wheels 11 are locked to lock the rotation member 30 to prevent the cable from being loosened so as to protect the cargo wound by the cable, thereby achieving the anti-theft purpose.

Accordingly, the release member 26 is locked onto the movable member 20 by the mandrel 42 of the locking unit 40 and cannot be pulled upwardly to detach the push plates 24 from the ratchet wheels 11 so that the ratchet wheels 11 are locked to lock the rotation member 30 to prevent the cable from being loosened so as to protect the cargo wound by the cable, thereby achieving the anti-theft purpose. In addition, the locking unit 40 is locked and unlocked easily and quickly, thereby facilitating the user operating the cable tightening device.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A cable tightening device, comprising:
a fixed unit including a base member;
a rotation member rotatably mounted on the base member of the fixed unit;
a movable unit including a movable member rotatably mounted on the rotation member and rotatable relative to the base member of the fixed unit to drive the rotation member to rotate relative to the fixed unit in a oneway direction, and a release member movably mounted on the movable member to lock or unlock the movable member and the base member;
a locking unit mounted on the release member of the movable unit and locked onto the movable member releasably to lock the release member onto the movable member releasably to stop movement of the release member so as to prevent the cable from being loosened.

2. The cable tightening device in accordance with claim 1, wherein:
the movable member of the movable unit has a side formed with a locking hole facing the release member;

the locking unit includes a lock body mounted on a surface of the release member of the movable unit, a spring-biased mandrel movably mounted in and protruded outwardly from the lock body and releasably locked in the locking hole of the movable member to lock the release member onto the movable member releasably, and a plurality of number wheels rotatably mounted on the lock body and connected to the mandrel to releasably lock the mandrel.

3. The cable tightening device in accordance with claim 2, wherein the locking hole of the movable member has a tapered side facing the mandrel of the locking unit, and the mandrel of the locking unit has a tapered distal end facing and matching the tapered side of the locking hole of the movable member.

4. The cable tightening device in accordance with claim 2, wherein:
the fixed unit further includes two opposite ratchet wheels secured on two opposite ends of the rotation member to rotate the rotation member;
the release member of the movable unit has a first end formed with two outwardly protruding push plates releasably engaged with the ratchet wheels of the fixed unit to push the ratchet wheels to rotate in a oneway direction when the movable member of the movable unit is rotatable toward the base member of the fixed unit.

5. The cable tightening device in accordance with claim 4, wherein the release member of the movable unit has a second end formed with a penetrated grip portion to facilitate a user holding the release member.

6. The cable tightening device in accordance with claim 4, wherein:
the fixed unit further includes a stop plate movably mounted on the base member and releasably engaged with the ratchet wheels to allow the ratchet wheels to rotate in a oneway direction;
the movable member of the movable unit has two opposite sidewalls each having a periphery formed with a push portion that is movable to push the stop plate of the fixed unit to detach from the ratchet wheels of the fixed unit.

7. The cable tightening device in accordance with claim 6, wherein:
the base member of the fixed unit has two opposite sidewalls each formed with an upwardly protruding catch portion and a retaining recess;
each of the push plates of the release member has a first side engaged with the respective ratchet wheel of the fixed unit and a second side rested on the respective catch portion of the fixed unit.

8. The cable tightening device in accordance with claim 7, wherein the catch portion of the fixed unit is located between the retaining recess of the fixed unit and the respective push plate of the release member.

9. The cable tightening device in accordance with claim 7, wherein the release member of the movable unit is pulled upwardly to pull the push plates of the movable unit outwardly relative to the ratchet wheels of the fixed unit to detach the push plates of the movable unit from the ratchet wheels of the fixed unit, and the movable member of the movable unit is pivoted outwardly relative to the base member of the fixed unit, so that the push plates of the movable unit pass by the catch portions of the fixed unit and are inserted into the retaining recesses of the fixed unit, while the push portions of the movable member are moved forward to push the stop plate of the fixed unit to detach from the ratchet wheels of the fixed unit.

10. The cable tightening device in accordance with claim 6, wherein the fixed unit further includes a fixing seat secured on the base member, and an elastic member biased between the stop plate and the fixing seat to push the stop plate toward the ratchet wheels.

11. The cable tightening device in accordance with claim 6, wherein the base member of the fixed unit has two opposite sidewalls each formed with a guide track to guide movement of the stop plate.

12. The cable tightening device in accordance with claim 6, wherein each of the two opposite sidewalls of the movable member is formed with a pivot hole pivotally mounted on the rotation member.

13. The cable tightening device in accordance with claim 4, wherein the movable member of the movable unit has two opposite sidewalls each formed with a guide track to guide movement of the respective push plate.

14. The cable tightening device in accordance with claim 13, wherein the movable unit further includes a torsion spring biased between the release member and the movable member to push the push plates of the release member toward the ratchet wheels of the fixed unit.

15. The cable tightening device in accordance with claim 14, wherein the torsion spring of the movable unit is mounted in a respective guide track of the movable member.

16. The cable tightening device in accordance with claim 13, wherein the locking hole of the movable member is located beside a respective guide track of the movable member.

* * * * *